H. C. INGRAM.
TIMING DEVICE.
APPLICATION FILED FEB. 9, 1916.
1,263,063.
Patented Apr. 16, 1918.
2 SHEETS—SHEET 1.
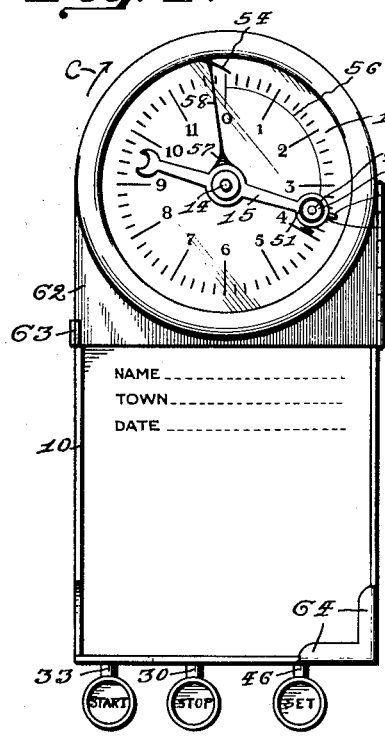
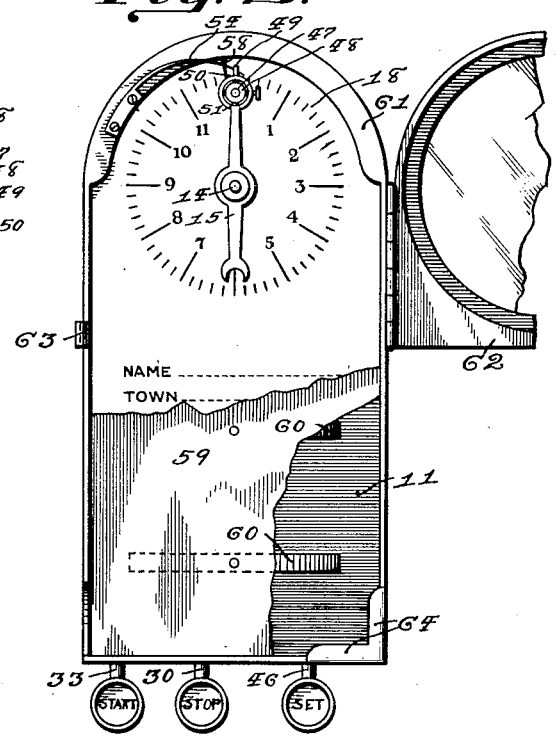
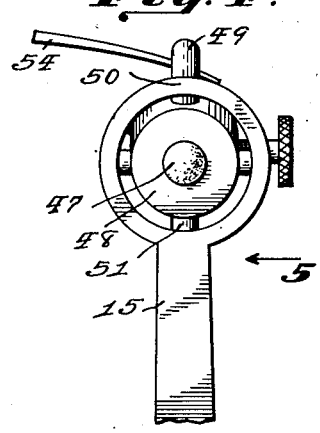
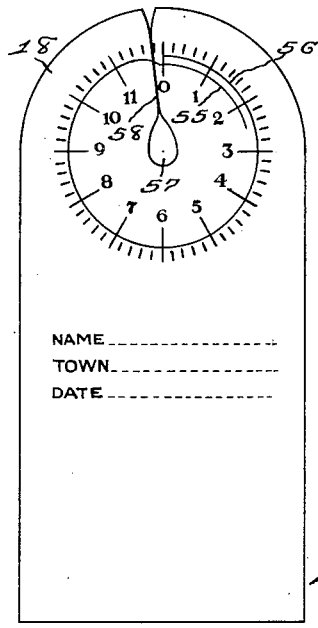
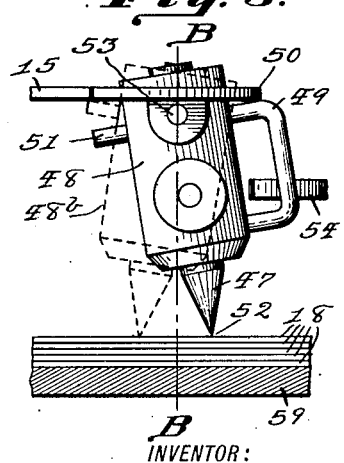
WITNESSES:
Frank P. Shepard.
C. B. Boulton
INVENTOR:
Herbert C. Ingram

H. C. INGRAM.
TIMING DEVICE.
APPLICATION FILED FEB. 9, 1916.

1,263,063.

Patented Apr. 16, 1918.

WITNESSES:
Frank P. Shepard.
C. B. Boulton.

INVENTOR:
Herbert C. Ingram.

UNITED STATES PATENT OFFICE.

HERBERT C. INGRAM, OF OKLAHOMA, OKLAHOMA, ASSIGNOR TO THE INGRAM CLOCK CO., OF OKLAHOMA, OKLAHOMA, A CORPORATION OF OKLAHOMA.

TIMING DEVICE.

1,263,063.              Specification of Letters Patent.         Patented Apr. 16, 1918.

Application filed February 9, 1916. Serial No. 77,156.

*To all whom it may concern:*

Be it known that I, HERBERT C. INGRAM, a citizen of the United States, residing at Oklahoma city, in the county of Oklahoma and State of Oklahoma, have invented certain new and useful Improvements in Timing Devices, of which the following is a specification, reference being had to the accompanying drawings.

The invention pertains to timing devices, such, for example, as those used for timing telephone calls, and more especially to that class of devices in which a revolving indicator arm is arranged to pass over a dial plate and make a record of the time thereof.

In the development of the invention, the inventor has provided upon the indicator arm an improved line-scribing mechanism adapted to automatically off-set itself in the event a second revolution of said arm over the dial-plate is begun, and said line-scribing mechanism is also arranged to automatically return to normal or initial position with respect to the indicator arm when the latter is reset to the zero point of the dial plate.

The inventor has further provided a new and improved dial-sheet which may be placed in or removed from recording position under the indicator arm without removing the latter from its supporting shaft.

Other objects and advantages of the invention will be set forth in the ensuing description.

The accompanying drawings show one embodiment of the invention in practical form.

Figure 1 is a plan view of the improved device, showing the indicator arm scribing a line on a dial-sheet.

Fig. 2 is a similar view, but with the indicator arm returned to zero position and with a certain door in open position.

Fig. 3 is a plan view of the improved dial-sheet.

Fig. 4 is a greatly enlarged plan view of the scribing end of the indicator arm and its scribing mechanism, showing also a small finger by which the scribing mechanism is reset to initial position.

Fig. 5 is an elevation view of the parts shown in Fig. 4, in the direction of the arrow 5.

Referrng to the several figures, in all of which like characters of reference designate like parts, the device includes an inclosing and supporting case 10 which may be of sheet metal, this case having near its upper edges a wall 11 to stiffen it and support other parts.

A clock movement 12 is secured to the under side of this wall 11, the movement including the usual balance-wheel 13 and other gearing of well known arrangement to drive said balance-wheel.

Figure 6:
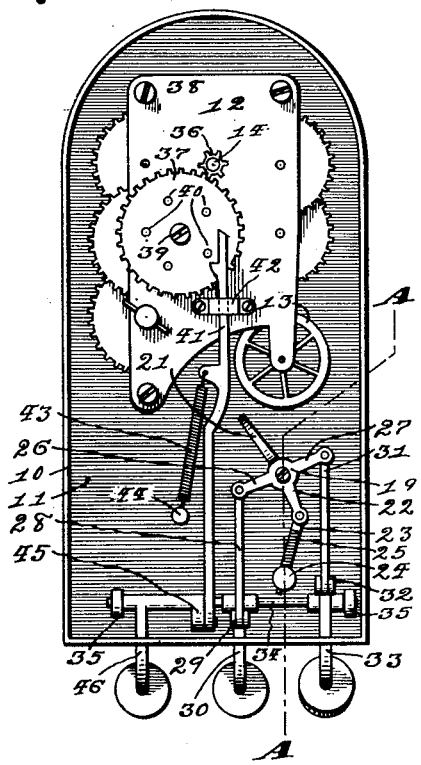
Fig. 6 is an inverted plan view of the device on the same scale as Figs. 1 and 2, showing the timing gearing released for action.
Figure 7:
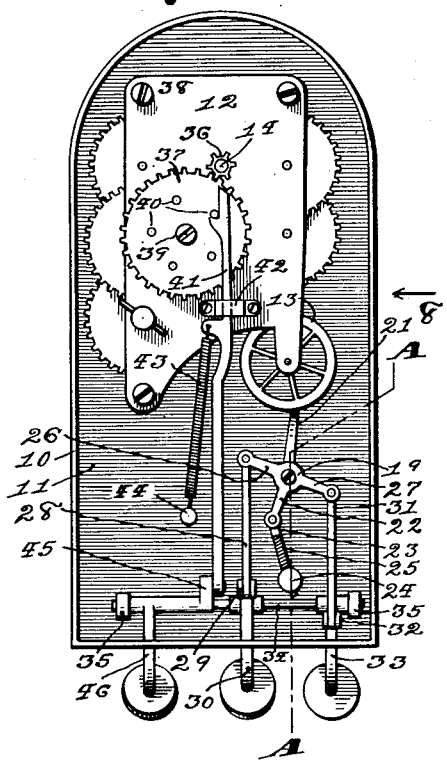
Fig. 7 is a similar view, but with the parts set to stop the action of the timing gearing and with certain resetting mechanism in operative position.
Figure 8:
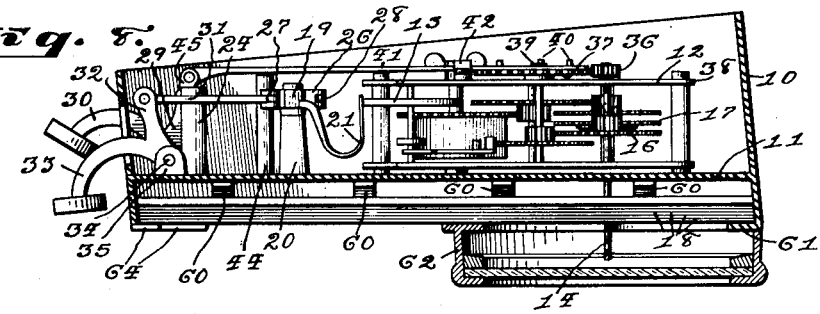
Fig. 8 is a side elevation showing the inverted parts in the same relative position as in Fig. 7, the view being taken in the direction of the arrow 8 of said Fig. 7 and with the inclosing case in section.
Figure 9:
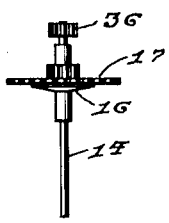
Fig. 9 is a view of a slip-gear in the same position in which it appears in Fig. 8.

One of the shafts, 14, of the clock movement 12 extends upward through the wall 11 of the base 10 and has the indicator arm 15 permanently mounted on it, this shaft having the well known slip-gear connection 16 with one of the gear-wheels, 17, as best shown in Fig. 9, to allow it and the indicator arm to be reset to zero position.

The clock movement 12 is arranged to drive the shaft 14 and indicator arm 15 at a speed of, say, one revolution in twelve minutes, and the dial-sheet 18 is graduated correspondingly.

In arranging improved means for stopping and starting the clock movement 12, a four-armed spider 19 is pivoted on a stud 20 depending from the supporting wall 11, and by revolving this spider one of its arms, 21, which is suitably shaped for resiliency, may be swung into yieldable frictional contact with the balance-wheel 13.

A second arm, 22, of the spider 19 has pivoted to it a thrust-rod 23 which extends slidably through a second stud 24 depending from the wall 11, a compression helical spring 25 being interposed between the enlarged pivotal end of said thrust-rod and said stud.

In swinging the arm 21 into or out of contact with the balance-wheel 13, the pivotal point of the arm 22 with the thrust-rod 23 moves to and across a neutral line A—A passing through the pivotal center of the spider 19 and through the stud 24, so that under the action of the spring 25 the arms of said spider tend to remain at one end or the other of their full throw.

For moving the spider 19, it is provided with two more arms 26 and 27, one of these arms, 26, being operatively connected by rod 28 to one arm 29 of a bell-lever key 30, while the other arm, 27, is operatively connected by a similar rod 31 to an arm 32 of a similar bell-lever key 33.

Both these keys 30 and 33 are pivoted on a shaft 34 which is supported by bearing 35 depending from the wall 11.

By the arrangement of parts shown, it will be seen that by depressing the key 30 the arm 21 of the spider 19 will be swung into engagement with the balance-wheel 13 with friction enough to hold the latter against movement; and that when the key 33 is depressed said arm 21 will be swung away from said balance-wheel, the frictional engagement of the arm in moving away starting the balance wheel to vibrate.

The lower end of the shaft 14 of the indicator arm 15 is provided with a gear-pinion 36 which is in permanent mesh with a larger gear-wheel 37 pivoted on the lower plate 38 by a screw 39.

This larger gear-wheel 39 is provided with a series of pins 40 which are in position to be engaged by a long pawl 41 as the latter is thrust forward.

A full throw of the pawl 41 against a single pin 40 swings the indicator arm 15 from any point of the dial-sheet 18 entirely back to the zero point.

The forward end of this pawl 41 is slidably supported in a keeper 42 secured to the lower plate 38 of the movement 12, and the pawl is yieldably held rearward out of the path of movement of the pins 40 by a tension spring 43 whose rear end is hitched to a stud 44 depending from said plate 11.

The pawl 41 is pivoted to and actuated by the depending arm 45 of a bell-lever key 46, this key being pivoted on the shaft 34 along with the keys 30 and 33.

The scribing end of the indicator arm 15 carries a marking stylus 47, preferably the lead of a common pencil which will leave a plain mark on the dial-sheet 18.

In attaching this stylus 47 to the indicator arm 15, a tubular stylus holder 48 is pivoted to the end of said arm so as to have the lower end of said holder swing only in a radial direction with respect to the axis-line of movement of said arm.

For purposes later shown, this holder 48 is provided on its outermost side with a wire loop 49; and the upper end of this loop properly limits the outward swinging movement of the lower end of the holder 48 by abutting the end 50 of the indicator arm 15, while a wire pin 51 on the innermost side of said holder properly limits its inward movement by abutting said arm 15.

The movement of the holder 48 should be so limited that the point 52 of its stylus 47 will swing an approximately equal distance on either side of a vertical line B—B passing through the pivotal point 53 of said holder; then, the tendency of the point 52 to slip away from said line when dragged over the surface of the dial-sheet 18 will hold said stylus at the full extremity of its throw on either side of said line.

In swinging the indicator arm 15 back to zero after each time-measuring period, the loop 49 of the stylus holder 48 is caught by the end of a spring finger 54 which is mounted on the forward or rounded end of the case 10, and the involute form of this finger with respect to the path of movement of the stylus holder 48 swings said holder outward into the starting position indicated by the full lines in Fig. 5.

If the indicator arm 15 does not make substantially a complete revolution, the holder 48 will not be swung from the starting position shown in Fig. 5, and will therefore return to the zero point in said position with the arm 15 without being acted upon by the finger 54; but in the event a time period requires a portion of a second revolution of the indicator arm the dragging of the loop 49 past the finger 54 in the recording direction indicated by the arrow C of Fig. 1 swings the holder 48 inward to the position indicated by the dotted lines 48$^b$ in Fig. 5 so that its stylus 47 will scribe a clean second line, as shown at 55 in Fig. 3, without retracing the first line 56.

To clear the shaft 14 of the indicator arm 15, the dial-sheet 18 is provided with a central opening 57.

In machines heretofore used, it is necessary to remove the indicator arm 15 in removing and replacing dial-sheets 18; but in the present invention the central, opening 57 of the dial-sheet 18 is provided with a radial outlet slit 58, whereby it may be slipped to and from place without removing the indicator arm.

The flexibility of the paper or other sheet material used for the dial-sheets 18 allows the edges at the slit 58 to raise up slightly and permit of the passage of the shaft 14 through said slit.

The outer end of the slit 58 may be slightly flared to aid in slipping it into place.

One or any number of the dial-sheets 18 may be stored under the indicator arm 15, so that when one has had a record made on it and been removed a succeeding one is presented in recording position; and these dial-sheets may be supported on a floating plate 59 which is backed up by springs 60 supported on the wall 11.

In opposition to the lifting springs 60, the pad of dial-sheets 18 is held down to a predetermined plane for proper record by an inward flange 61 around the forward curved end of the case 10, by the door 62 which is held in closed position by a latch 63, and by a pair of short inward flanges 64 at the right-hand rear corner of said case; and in removing a dial-sheet it is only necessary to open the door 62.

Having thus described the invention, I claim:—

1. In a device of the class described, a support for a dial-sheet, an indicator arm arranged to revolve over the support, a line-scribing tool carried movably on the indicator arm, and yieldable means carried by the edge of the support and adapted to shift position of the line-scribing tool on the indicator arm as the latter is revolved.

2. In a device of the class described, a support for a dial-sheet, an indicator arm arranged to revolve over the support, a line-scribing tool carried by the indicator arm and adapted to be shifted radially thereon, and a shifting finger carried by the outer edge of the support, said finger curving inward over the support and across the path of movement of the line-scribing tool and being yieldable.

3. In a device of the class described, an indicator arm adapted to revolve over a dial-sheet, a line-scribing tool pivoted to and depending from the indicator arm in position to scribe a line on the dial-sheet, a resilient member fixed at a point adjacent the dial-sheet and adapted to act on the line-scribing tool, said member and tool being so arranged that when the indicator arm is returned to zero the tool is returned to initial scribing position but when said indicator arm is revolved more than one revolution from the zero point in scribing direction the scribing tool is off-set to avoid retracing the initial line.

4. In a device of the class described, a support, a dial-sheet on the support, an indicator arm arranged to revolve over the dial-sheet, a line-scribing tool pivoted to and depending from the indicator arm, and a spring finger fixed to the support at the edge of the dial-sheet and curving in over said dial-sheet into the path of movement of the scribing tool.

5. In a device of the class described, a support for a dial-sheet, an indicator arm arranged to be revolved over the dial-sheet, a line-scribing tool carried by the indicator arm and arranged to be shifted radially on said indicator arm to off-set the scribed line, a spring finger carried by the edge of the support and adapted to shift said line-scribing tool on the indicator arm, said finger extending in the direction of movement of the line-scribing tool and curving inward across the path of movement of said tool, whereby the tool will be shifted inwardly along the indicator arm when passing said finger in scribing direction but will be shifted outward on said indicator when passing said finger in opposite direction.

6. In a device of the class described, a support for a dial-sheet, an indicator arm arranged to be revolved over the support, a line-scribing tool pivoted to and depending from an outward portion of the indicator arm and arranged to swing in a radial direction with respect to said arm, the indicator arm being elastic and acting to force the lower or free end of the line-scribing tool against the support, and means for limiting the swinging movement of the line-scribing tool on either side of a perpendicular line extending upward from the support.

7. In a device of the class described, a support for a dial-sheet, an indicator arm arranged to be revolved over the support, a line-scribing tool pivoted to and depending from an outward portion of the indicator arm and arranged to swing in a radial direction with respect to said arm, the indicator arm being elastic and acting to force the lower or free end of the line-scribing tool against the support, means limiting the swinging movement of the line-scribing tool on either side of a perpendicular line extending upward from the support, means whereby the line-scribing tool is swung from one side of said perpendicular line to the other side upon the beginning of a second revolution of the indicator, and means whereby return of the indicator arm backward to beginning position swings the line-scribing tool from said other side of the perpendicular line back to the initial side of said line.

8. In a device of the class described, a support for a dial-sheet, an indicator arm arranged to be revolved over the support, a line-scribing tool pivoted to and depending from an outer portion of the indicator arm and arranged to be swung in a radial direction with respect to said arm, the indicator arm being elastic and acting to force the lower or free end of the line-scribing tool against the support, a spring finger carried by the outer edge of the support, said finger extending in the direction of movement of the indicator arm and curving inward across the path of movement of the line-scribing tool, and means for revolving the indicator arm.

9. In a device of the class described, a support for a dial-sheet, an indicator arm arranged to be revolved over the dial-sheet, a stylus holder pivoted to and depending from an outer portion of the indicator arm and arranged to be swung in a radial direction with respect to said arm, the stylus holder having on its outermost side a loop, a spring finger carried by the outer edge of the support, said finger extending in the direction of movement of the indicator arm and curving inward across the path of movement of said loop, and means for revolving the indicator arm.

10. In a device of the class described, a support for a dial-sheet, an indicator arm arranged to revolve over said support, a tubular stylus holder pivoted to and depending from the end of the indicator arm and arranged to swing only in a radial direction with respect to said indicator arm, the indicator arm being elastic and adapted to force the point of a stylus held by the stylus holder into marking contact with the support, and means carried by the stylus holder for limiting its swinging movement on either side of a perpendicular line extending upward from the face of the support.

Witness my hand this 3 day of February, 1916.

HERBERT C. INGRAM.

Witnesses:
 FRANK P. SHEPARD,
 A. K. BOWSE.